United States Patent
Wang et al.

(10) Patent No.: US 10,604,081 B2
(45) Date of Patent: Mar. 31, 2020

(54) VEHICLE AUXILIARY DISPLAY DEVICE, DISPLAY METHOD AND VEHICLE

(71) Applicant: BOE TECHNOLOGY GROUP CO., LTD., Beijing (CN)

(72) Inventors: Zifeng Wang, Beijing (CN); Nannan Hu, Beijing (CN); Yan Ren, Beijing (CN); Lei Cao, Beijing (CN); She Lin, Beijing (CN); Guodong Huang, Beijing (CN); Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 15/743,119

(22) PCT Filed: Jun. 21, 2017

(86) PCT No.: PCT/CN2017/089342
§ 371 (c)(1),
(2) Date: Jan. 9, 2018

(87) PCT Pub. No.: WO2018/036250
PCT Pub. Date: Mar. 1, 2018

(65) Prior Publication Data
US 2019/0100157 A1 Apr. 4, 2019

(30) Foreign Application Priority Data
Aug. 24, 2016 (CN) .......................... 2016 1 0721420

(51) Int. Cl.
*H04N 7/18* (2006.01)
*B60R 11/04* (2006.01)
(Continued)

(52) U.S. Cl.
CPC ................ *B60R 11/04* (2013.01); *B60R 1/00* (2013.01); *B60R 11/0235* (2013.01);
(Continued)

(58) Field of Classification Search
CPC ....... B60R 11/04; B60R 11/0235; B60R 1/00; B60R 2011/004; B60R 2300/202; B60R 2300/8026; B60R 2300/303
(Continued)

(56) References Cited

U.S. PATENT DOCUMENTS

| 2004/0004541 | A1 | 1/2004 | Hong |
| 2008/0012938 | A1* | 1/2008 | Kubota .................. B60Q 9/008 348/118 |

(Continued)

FOREIGN PATENT DOCUMENTS

| CN | 1962315 A | 5/2007 |
| CN | 202879353 U | 4/2013 |

(Continued)

OTHER PUBLICATIONS

Search Report and Written Opinion dated Sep. 26, 2017 from State Intellectual Property Office of the P.R. China.
Second Chinese Office Action dated Jul. 30, 2019.

*Primary Examiner* — Richard T Torrente
(74) *Attorney, Agent, or Firm* — Dilworth & Barrese, LLP.; Michael J. Musella, Esq.

(57) ABSTRACT

A vehicle auxiliary display device includes: a first camera configured to acquire a first image of a position of a user; a second camera configured to acquire a second image within a first range on an outside of a pillar of a vehicle; and a processor configured to determine a shielding area of the pillar shielding the user's line of sight based on the first image, extract an image of the shielding area from the second image based on the second image, and send the image of the shielding area to the user.

13 Claims, 6 Drawing Sheets

(51) Int. Cl.
 *B60R 1/00* (2006.01)
 *B60R 11/02* (2006.01)
 *B60R 11/00* (2006.01)
(52) U.S. Cl.
 CPC ... *B60R 2011/004* (2013.01); *B60R 2300/202* (2013.01); *B60R 2300/303* (2013.01); *B60R 2300/605* (2013.01); *B60R 2300/8026* (2013.01)
(58) Field of Classification Search
 USPC .......................................................... 348/148
 See application file for complete search history.

(56) References Cited

U.S. PATENT DOCUMENTS

2015/0336511 A1* 11/2015 Ukeda ........................ B60R 1/00
 348/148
2019/0031102 A1* 1/2019 Kishimoto ............. H04N 5/232

FOREIGN PATENT DOCUMENTS

| CN | 103358996 A | 10/2013 |
| CN | 203294011 U | 11/2013 |
| CN | 104890574 A | 9/2015 |
| CN | 204774935 U | 11/2015 |
| JP | 2005184225 A | 7/2005 |

\* cited by examiner

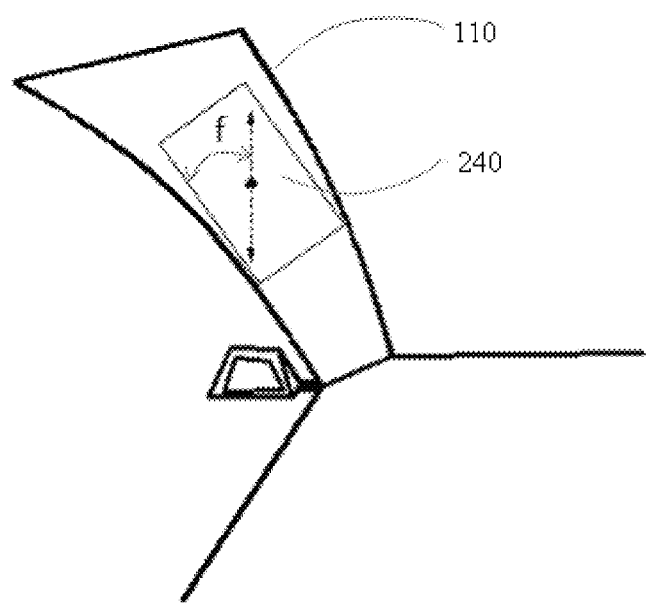
FIG. 5a
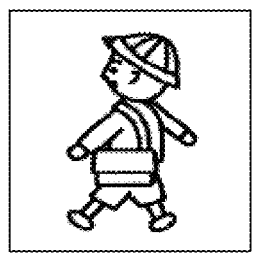 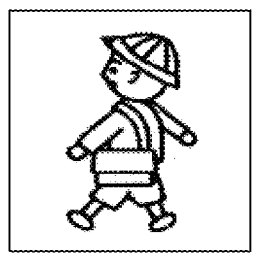 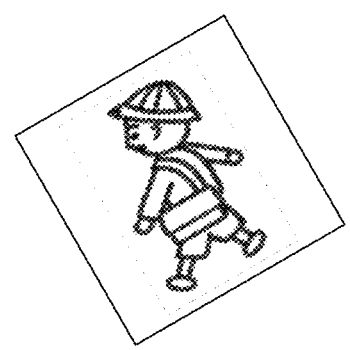
FIG. 5b         FIG. 5c         FIG. 5d

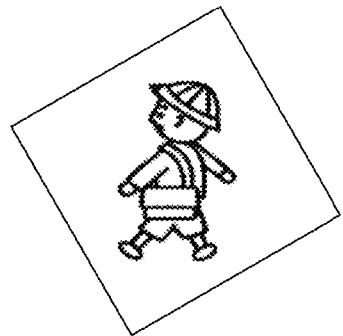
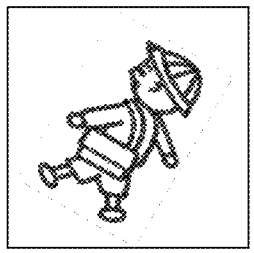
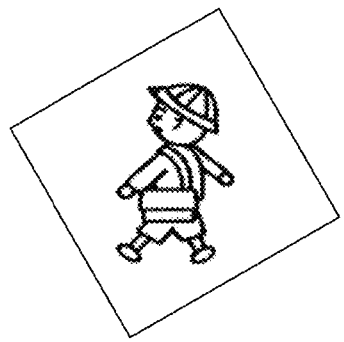
FIG. 5e  FIG. 5f  FIG. 5g
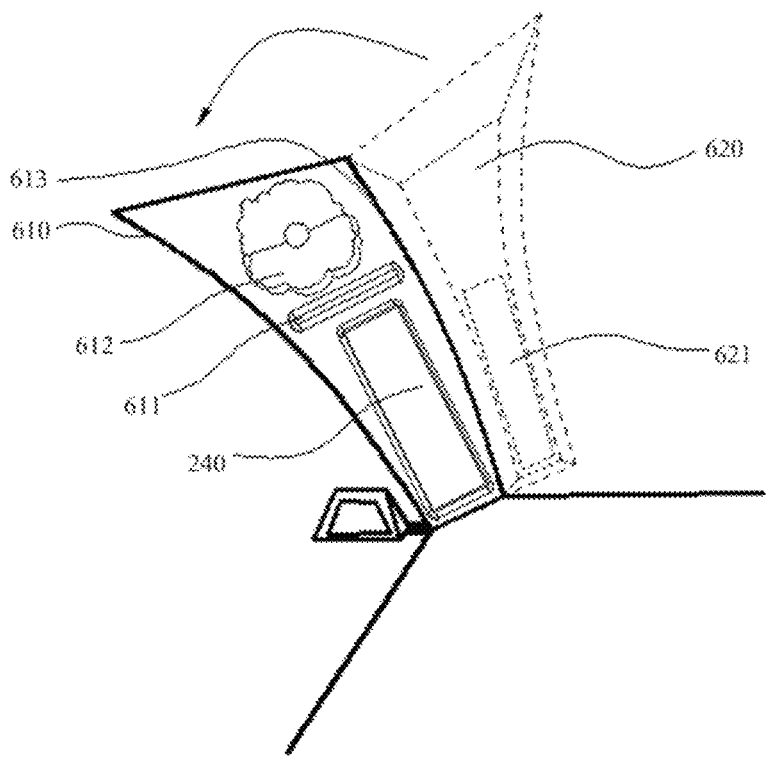
FIG. 6

VEHICLE AUXILIARY DISPLAY DEVICE, DISPLAY METHOD AND VEHICLE

TECHNICAL FIELD

Embodiments of the present disclosure relate to a vehicle auxiliary display device, a display method of the vehicle auxiliary display device, and a vehicle comprising the vehicle auxiliary display device.

BACKGROUND

At present, cars, as one kind of the most commonly used transport means, have entered millions of households. With the popularization of cars, the driving safety problem is also getting more and more attention. One of the most common safety problems involves the blind areas formed by A pillars of a car. The A pillars are connecting pillars on the front left side and the front right side of the car for connecting the roof and the front cabin. For a car, pillars such as the A pillars not only have a supporting function but also play the role of door frame. However, the pillars produce visual blind areas for drivers, and this effect due to the A pillars is the most obvious. There is a dilemma for the width of an A pillar (affecting the cross section thereof). If the width is too small, the bearing capacity in unexpected situations will be advantageously affected, but if the width is too large, the user's field of view will be advantageously affected, which situations may therefore be detrimental to safety.

SUMMARY

The objectives of the embodiment of the present disclosure is to provide a vehicle auxiliary display device, a display method thereof and a vehicle comprising the same.

At least an embodiment of the present disclosure provides a vehicle auxiliary display device, comprising: a first camera configured to acquire a first image of a position of a user; a second camera configured to acquire a second image within a first range on an outside of a pillar of a vehicle; and a processor configured to determine a shielding area of the pillar shielding the user's line of sight based on the first image, extract an image of the shielding area from the second image based on the second image, and send the image of the shielding area to the user.

For example, the first camera is configured to acquire the first image according to a first space determined by an area provided with a main driving seat and a height of an A pillar as the pillar in a direction perpendicular to a plane provided with the vehicle.

For example, the second camera is configured to acquire the second image according to a second space defined by first extension lines of connecting lines of at least part of vertexes of the first space and at least part of vertexes of the A pillar.

For example, the first image acquired by the first camera includes an image of the user's eyes; and the processor determines a position of the user's eyes based on the first image, determines a coordinate of the user's eyes in the first space based on the position of the user's eye, and determines the shielding area of the A pillar shielding the user's line of sight based on the coordinate.

For example, the processor determines second extension lines of connecting lines from the coordinate to the vertexes of the A pillar, and determines the shielding area of the A pillar shielding the user's line of sight based on the second extension lines.

For example, the processor determines vertexes of the shielding area in the second image according to the second extension lines, and extracts the image of the shielding area from the second image based on the vertexes of the shielding area.

For example, the second camera is configured to acquire the second image by forming a first angle with respect to the direction perpendicular to the plane provided with the vehicle.

For example, the device further comprises a display configured to display the image of the shielding area.

For example, the display is configured to form a second angle with respect to the direction perpendicular to the plane provided with the vehicle; the display is disposed on the A pillar, so that the image of the shielding area displayed on the display can be inclined relative to an edge of the display but not inclined relative to the direction perpendicular to the plane provided with the vehicle.

For example, the first angle, the second angle and an angle of the A pillar relative to the direction perpendicular to the plane provided with the vehicle are all equal.

At least an embodiment of the disclosure further provides a vehicle, the vehicle comprises pillars and the vehicle auxiliary display device, and one of the pillars is equipped with a display of the vehicle auxiliary display device.

For example, the pillars include A pillars; and the vehicle auxiliary display device is disposed on at least one A pillar on the front of the vehicle.

For example, the at least one A pillar includes a body; the body includes a barrier part and a safety airbag; and the barrier part is configured to isolate the safety airbag from the display.

For example, the at least one A pillar further includes a shield; and the shield is capable of covering the body of the A pillar and is able to be turned on or off relative to the body of the A pillar.

For example, an opening is disposed at a position of the shield corresponding to the display and configured to expose a display area of the display.

At least an embodiment of the disclosure still further provides a display method of a vehicle auxiliary display device, the vehicle auxiliary display device comprising a first camera and a second camera, the display method comprising: adopting the first camera to acquire a first image of a position of a user; adopting the second camera to acquire a second image within a first range on an outside of a pillar; determining a shielding area of the pillar shielding the user's line of sight based on the first image, and extracting an image of the shielding area from the second image based on the second image; and sending the extracted image of the shielding area to the user.

For example, the first camera is adopted to acquire the first image according to a first space determined by an area provided with a main driving seat and a height of an A pillar as the pillar in a direction perpendicular to the plane provided with the vehicle.

For example, the second camera is adopted to acquire the second image according to a second space formed by first extension lines of connecting lines of at least part of vertexes of the first space and at least part of vertexes of the A pillar.

For example, the first camera is adopted to acquire the first image including an image of the user's eyes, determine the position of the user's eyes based on the first image, determine a coordinate of the position of the user's eyes in the first space based on the position of the user's eye, and determine the shielding area of the A pillar shielding the user's line of sight based on the coordinate.

For example, second extension lines of connecting lines from the coordinate to the vertexes of the A pillar are determined, and the shielding area of the A pillar shielding the user's line of sight is determined based on the second extension lines.

For example, vertexes of the shielding area in the second image are determined according to the second extension lines; and the image of the shielding area is extracted from the second image based on the vertexes of the shielding area.

For example, the second camera is configured to acquire the second image relative to the direction perpendicular to the plane provided with the vehicle.

For example, the display method further comprises: displaying the image of the shielding area on a display on the pillar.

For example, the display is configured to form a second angle with respect to the direction perpendicular to the plane provided with the vehicle, so that the image of the shielding area displayed on the display can be inclined relative to an edge of the display but not inclined relative to the direction perpendicular to the plane provided with the vehicle.

For example, the first angle, the second angle and an angle of the A pillar relative to the direction perpendicular to the plane provided with the vehicle are all equal.

In the embodiment of the present disclosure, external condition corresponding to the blind area of the A pillar is reflected on a display of the A pillar in real time after image processing according to the observing position of the human eyes, so the perspective effect of the A pillar can be achieved, and hence the driving safety can be improved.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIGS. 5a-5g are schematic diagrams illustrating the monitoring modes of a second camera in an embodiment of the present disclosure;

FIG. 6 is a schematic structural view illustrating the inside of the A pillar of the car in an embodiment of the present disclosure.

DETAILED DESCRIPTION

Figure 1:
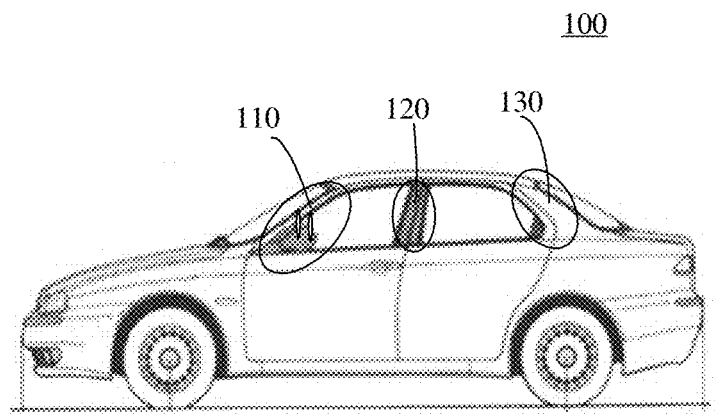
FIG. 1 is a schematic structural view of car pillars in the embodiment of the present disclosure.

Detailed description will be given below to the preferred embodiments of the present disclosure with reference to the accompanying drawings. It should be noted that: in the description and the accompanying drawings, basically same steps and elements are marked by same reference numerals of the accompanying drawings, and the repeated description of the steps and the elements is omitted.

In the following embodiments of the present disclosure, "vehicle" refers to a non-rail-supported vehicle having three or more wheels, being driven by power and for carrying people and/or freight, for instance, including non-convertible motor tricycles, cars, trucks, etc. Description is given in the embodiment of the present disclosure by taking the car as an example.

FIG. 1 is a schematic structural view of car pillars in an embodiment of the present disclosure. As shown in FIG. 1, a car 100 includes three kinds of pillars which are sequentially an A pillar 110, a B pillar 120, and a C pillar 130 from front to back. Although only pillars on the left side are shown in FIG. 1, it should be understood by those skilled in the art that the A pillar, the B pillar and the C pillar are also correspondingly disposed on the right side of the car. The vehicle auxiliary display device and the display method, provided by the embodiment of the present disclosure, not only can be applicable to an A pillar to solve the blind area problem of the A pillar but also can be applicable to a B pillar and a C pillar to solve the blind area problem of the B pillar and the C pillar, for instance, displaying shielding areas of the B pillar and the C pillar while reversing or parking. Description will be given below to the system and the method provided by the embodiment of the present disclosure by taking the A pillar only as an example. The technical proposals for solving the blind area problem of the B pillar and the C pillar can be also realized by those skilled in the art according to similar methods.

Figure 2:
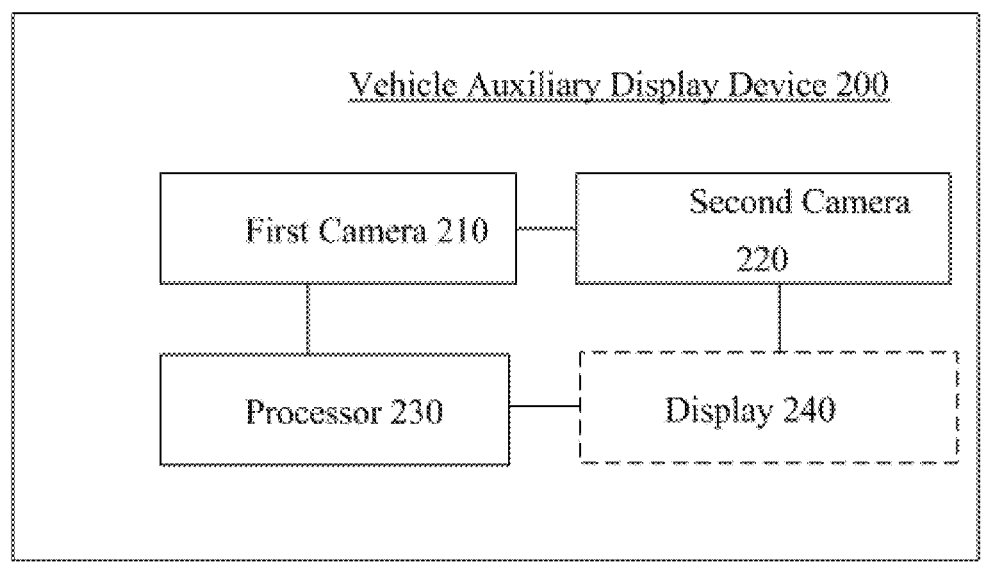
FIG. 2 is a schematic structural view of a vehicle auxiliary display device provided by an embodiment of the present disclosure.

FIG. 2 is a schematic structural view of a vehicle auxiliary display device provided by an embodiment of the present disclosure. As illustrated in FIG. 2, the vehicle auxiliary display device 200 comprises a first camera 210, a second camera 220 and a processor 230. The processor 230 can be a general purpose processor, e.g., a central processing unit (CPU), and may also be a special purpose processor, e.g., a programmable logic circuit (PLC).

According to one example of the present disclosure, the vehicle auxiliary display device may further comprise a display 240. The display 240 is disposed on one pillar (e.g., an A pillar) of a car. A display unit 320, for instance, may be a liquid crystal display (LCD) or an organic light-emitting diode (OLED) display and may also have touch function. Of course, alternatively, the display may also be not used, but virtual reality (VR) or augmented reality (AR) glasses or projector is used.

According to one example of the present disclosure, the first camera 210 is configured to monitor and acquire a first image of the position of a user. The acquisition methods, for instance, may involve that the acquisition is conducted facing the position of the user and may also be conducted in an oblique direction, not facing the position of the user. The user, for instance, is the driver for driving the vehicle. The second camera 220 is configured to acquire a second image within a first range outside the car pillar. The first range at least includes an area shielded by the pillar. The processor 230 is configured to determine a shielding area corresponding to the car pillar shielding the user's line of sight based on the first image, extract an image of the shielding area from the second image based on the second image, and send the image to the user for viewing. For instance, the image is sent to the display 240 for display. Correspondingly, the display 240 is configured to display the image of the shielding area of the pillar. Moreover, for instance, for the user to view the area shielded by the pillar, the image of the shielding area can further be projected onto the pillar via a projector. Of course, when the user wears VR or AR glasses, the image of the shielding area may also be sent onto the VR or AR glasses.

In the example of one embodiment of the present disclosure, the car pillar provided with the display is the A pillar. In order to solve the technical problem of the blind area of the A pillar, for instance, the first camera 210 may monitor and acquire the first image according to a first space determined by the position of the main driver's seat and the vertical height of the A pillar. For instance, the second camera may acquire the second image by determining the monitored first range according to the relative positional relationship of the first space and the A pillar. For instance, when the first space is set to be a rectangle, a second space (space range) is determined as the monitored first range according to the vertexes of the rectangle and the vertexes of the A pillar.

Figure 3A:
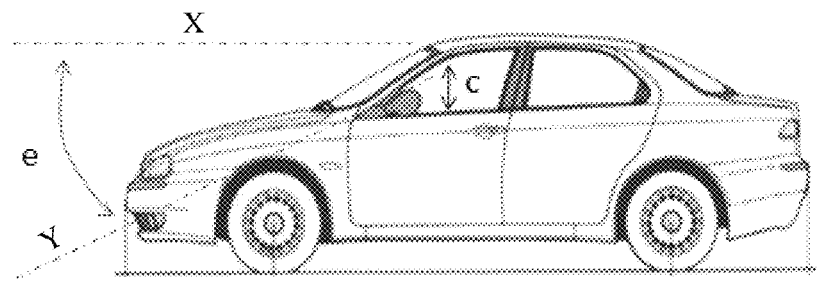
FIG. 3a is a side view of a car in an embodiment of the present disclosure.
Figure 3B:
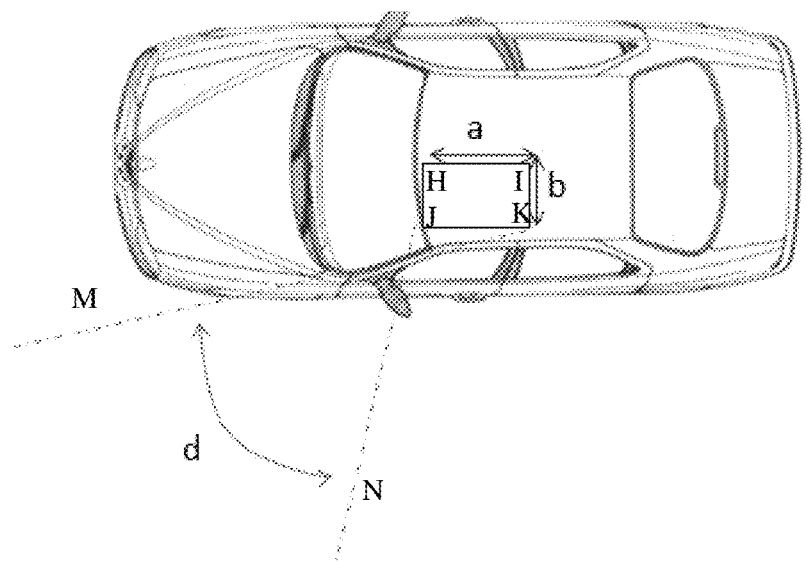
FIG. 3b is a top view of the car in the embodiment of the present disclosure.
Figure 3C:
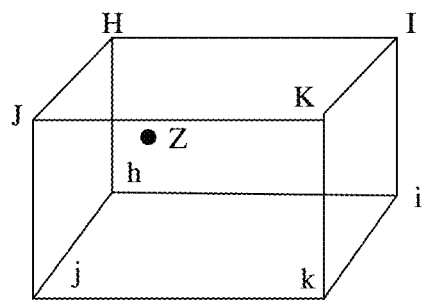
FIG. 3c is a schematic diagram illustrating the positional relationship of a first space.
Figure 4:
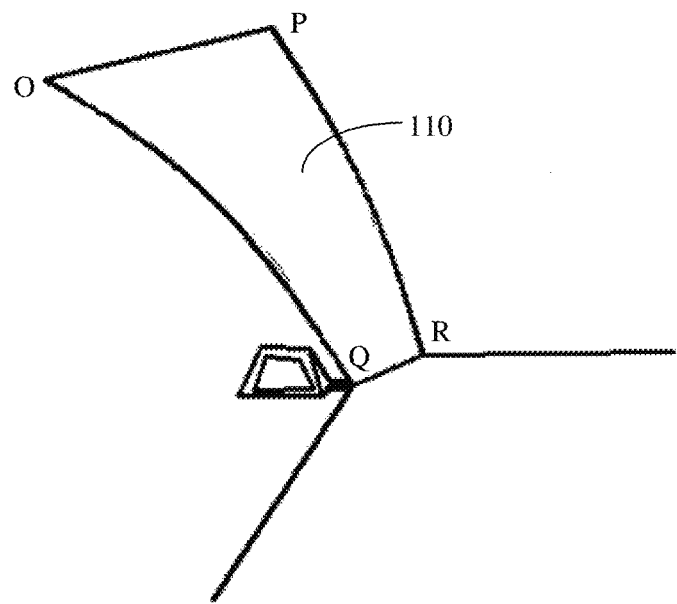
FIG. 4 is a schematic diagram illustrating the external shape of the A pillar in an embodiment of the present disclosure.

FIGS. 3a-3b are schematic diagrams illustrating monitoring areas of the first camera and the second camera in the example of the embodiment of the present disclosure. FIG. 3c is a schematic diagram of the first space. FIG. 4 is a schematic diagram illustrating the external shape of the A pillar in the embodiment of the present disclosure. Description will be given below to the position of the monitoring areas of the first camera and the second camera with reference to FIGS. 3a-3c and 4.

In order to accurately determine the visual blind areas of the user (namely areas that is outside of the car and cannot be viewed by the user in the car due to the shielding of the pillar), the position of the user in the car is determined at first. As shown in FIG. 3a, taking an A pillar on the left of a left rudder car as an example, the height of the A pillar of the car may be the vertical distance from the top of the A pillar (the position intersected with the ceiling of the car) to the bottom (for instance, the position intersected with the lower edge of the window), and this vertical distance is the length of a vertical line c in FIG. 3a. In addition, straight lines X and Y in FIG. 3a illustratively provide the front view range e when the user looks straight ahead.

In addition, the user sits in the main driving position while driving, so the possible position of the user in the car can be determined by, for example, obtaining an area where the main driving seat is located. As shown in FIG. 3b, an upper surface of a main user seat is generally regarded as a rectangle or a rectangle-like shape, e.g., a rectangle or a square. The corresponding four vertexes of the rectangle on a bottom horizontal plane in the height direction of the A pillar (namely the horizontal plane where the bottom of the line c ends) are respectively marked by characters: h, i, j and k, and the corresponding four vertexes of the rectangle on a top horizontal plane in the height direction of the A pillar (namely the horizontal plane where the top of the line c ends) are respectively marked by characters: H, I, J and K as shown in the drawing. Thus, the eight vertexes form a rectangular space as shown in FIG. 3c. The height of the rectangular space is as described above and is the height c of the A pillar. The length of the rectangle along the length direction of the car is the length a of the rectangular seat, and the width along the width direction of the car is the width b of the rectangular seat. That is to say, the distance between H and I or the distance between J and K is a, and the distance between H and J or the distance between I and K is b. Because the body of the user generally does not move from the position of the main user seat while driving, the user's eyes are within the range of the main driving seat determined by the rectangle. Moreover, as the user needs to view the traffic around through a front windshield as well as the left and right windshields (windows), the position of the user's eyes is within the space range. Therefore, the space range of the user's eyes is a rectangular area formed in the height direction of the A pillar, and the length, the width and the height are respectively a, b and c. The rectangular area is defined as the first space, namely the area to be monitored and captured by the first camera.

As shown in FIG. 3c, the first space includes eight vertexes H, I, J, K, h, i, j and k. H, I, J and K are four vertexes on the top in the height direction of the A pillar, and h, i, j and k are four vertexes at the bottom in the height direction of the A pillar. The first camera can capture the position of the first space when mounted on the car, for instance, may be mounted on the inside or the outside of the car, more specifically, for instance, may be mounted at an area above or aside a front windshield on the inside of the car or above a windshield on the outside of the car, so that the first camera can randomly acquire the position of the user, particularly the first image of the position of the user's eyes.

Beside that the first camera is adopted to acquire the position of the user, the second camera is adopted to capture the second image within the first range on the outside of the corresponding A pillar of the car. The first range at least includes a visual blind area of the user caused by the A pillar. For instance, the second camera may be placed at a position where the second image within the first range on the outside of the car can be acquired, for instance, on the inside or the outside of the car, e.g., at a position of a rear-view mirror of the car or on a side surface of the front windshield.

As the body of the user generally does not move from the first space in the driving process, for the purpose of convenient determination of an external area of the car where the user's line of sight is shielded by the A pillar, in the example of the embodiment of the present disclosure, a predetermined space range on the outside of the car pillar of the second image acquired by the second camera, namely a second space, can be determined according to the border of the first space, for instance, the vertexes of the first space and the vertexes of the A pillar. Description will be given below to one example of how to determine the second space based on this method.

As described above, the length, the width and the height of the first space are respectively a, b an c; the first space is a rectangular area formed in the height direction of the A pillar and includes eight vertexes; part of the vertexes or all the vertexes therein can be selected to lead straight lines towards part of the vertexes or all the vertexes of the A pillar, so as to determine the second space including the shielding area on the outside of the car where the user's line of sight is shielded by the A pillar. For instance, the right front vertex and the left rear vertex among the 8 vertexes may be selected as two vertexes of a diagonal, so as to determine the maximum range of the second space as much as possible. Moreover, for instance, 4 vertexes on the upper part of the first space may be selected to lead straight lines towards 2 vertexes on the upper part of the A pillar, or 4 vertexes on the lower part of the first space may also be selected to lead straight lines towards 2 vertexes on the lower part of the A pillar. Of course, the 8 vertexes may also be adopted to respectively lead straight lines towards the 4 vertexes of the A pillar, and the most marginal extension line is selected to form the second space.

FIG. 4 is a schematic diagram illustrating the shape of the left front A pillar of the car (the rear-view mirror on the left is included in the figure). The surface of the A pillar on the left observed by the main driver sitting at the main driving position inside the car is as shown in FIG. 4. The surface is, for instance, an irregular curved surface. The curved surface includes four vertexes O, P, Q and R, in which P and R points are in the front, and O and Q points are in the rear. The shape of the A pillar on the right may be the same as that of the A pillar on the left, although the positions relative to the driver are different.

With reference to FIGS. 3b and 4, in the example, two vertexes among the eight vertexes of the first space may be selected to lead straight lines towards two vertexes of the A pillar. For instance, an upper vertex on the left rear side of the first space, namely the K point, is selected at first, and then an upper vertex on the right front side of the first space, namely the H point, is selected. The K point is connected with an upper vertex on the right front side of the A pillar, namely the P point, to obtain a horizontal straight line M as shown in FIG. 3b; and the H point is connected with an upper vertex on the left front side of the A pillar, namely the O point, to obtain a horizontal straight line N as shown in FIG. 3b. The straight lines M and N are in the same horizontal plane. The area (range) between the lines M and N can be taken as a horizontal range d monitored by the second camera and the height range may be selected as the car height.

Further alternatively, with reference to FIGS. 3b and 4, an upper vertex on the left front side of the first space, namely the J point, which is the closest to the A pillar on the left, is selected. The J point is connected with the upper vertex on the right front side of the A pillar, namely the P point, to obtain a horizontal straight line. The J point is connected with the upper vertex on the left front side of the A pillar, namely the O point, to obtain another horizontal straight line. The two straight lines are also in the same horizontal plane. The area (range) between the two straight lines can be taken as a horizontal range d monitored by the second camera, and the height range may be selected as the car height.

The space determined according to the horizontal range and the height range may be defined as the second space which covers the shielding area on the outside of the car where the line of sight is shielded by the A pillar, namely the visual blind area. It should be understood by those skilled in the art that the method for determining the range of the second space captured by the second camera is not limited to the above example, as long as the second space can cover the shielding area of corresponding car pillar for shielding the user's line of sight.

After determining the second space, the second camera may be disposed at one position, where the second image of the second space may be acquired, so that the acquired second image can include the visual blind area without excluding any line-of-sight area which is shielded.

Because the area captured by the second camera for the second image of the second space is larger than the visual blind area, if the entire second image is directly displayed to the user, it is helpful for user observation as a whole. In order to obtain the image of the shielding area of the A pillar shielding the user's line of sight from the second image, the processor 230 may determine the shielding area of the A pillar shielding the user's line of sight based on the first image, and subsequently further extract the image of the shielding area from the second image based on the second image.

In order to determine the shielding area of the A pillar of the car that shields the user's line of sight, the position of the user's eyes, the position of a center point (the space between the eyebrows) of a connecting line of two eyes, or the like may be determined at first. In an embodiment of the present disclosure, the position of the user's eyes can be determined according to the first image acquired by the first camera. For instance, the image of the user's eyes is extracted by way of image recognition, and subsequently a coordinate of the eye position in the first space is determined. A coordinate system in the first space, for instance, may adopt a vertex in the first space that is the closest to the bottom of the A pillar as an origin (namely the j point), adopt the direction parallel to the car width as an X axis, adopt the direction parallel to the car length as a Y axis, and adopt the height direction as a Z axis. The coordinate values of the user's eyes in the directions of the X axis, the Y axis and the Z axis are determined, and then the coordinate of the user's eyes in the first space are determined. In addition, for the convenience of obtaining the positions of the user's eyes by the first camera, for instance, part of reference points may be provided inside the car body for helping image recognition.

After the coordinate of the user's eyes are determined, the shielding area of the A pillar may be determined according to the coordinates and the dimension parameters of the car. The dimension parameters of the car include the size of the car seat, the shape and the size of the A pillar of the car, the relative position between the car seat and the A pillar, etc. The dimension parameters may be fixed or measurable for each car model and hence can be easily obtained.

With reference to FIG. 3c, supposing that the user's eyes are disposed at a Z point and the coordinate of the Z point is (x1, y1, z1), the shielding area of the A pillar of the car that shields the user's line of sight is determined based on the coordinate of the Z point. According to one example of the present disclosure, the processor 230 determines extension lines from the coordinate Z to the A pillar, for instance, extension lines to the vertexes of the A pillar, so as to define a space range similar to a pyramid. For instance, the space range on the outside of the car is defined according to extension lines of straight lines from the coordinate Z to the vertexes O, P, Q and R of the A pillar. The space range is regarded as the shielding area of the user relative to the A pillar.

Subsequently, the processor 230 extracts the image of the shielding area from the second image based on the second image. For instance, the image of the shielding area is segmented from the second image that is formed through the acquisition of the second space by the second camera 120. For instance, the coordinates of the extension lines of the straight lines from the Z point of the user's eyes in the first space to the vertexes O, P, Q and R of the A pillar, mapped into the second image, may be determined at first, and the image of the shielding area is extracted from the second image according to the coordinates. For instance, after the coordinate Z is determined, the distances of connecting lines from the Z point in the first space to various vertexes H, I, J and K of the first space, the distances of connecting lines from the Z point to the vertexes of the A pillar, and the angles among the connecting lines can be determined. Subsequently, coordinate values of the coordinates of the extension lines from the Z point to the vertexes of the A pillar can be determined based on geometric calculation according to the position and the shooting range of the second camera and the predetermined directions of the extension lines of the second space and mapped into the second image, and the image of the shielding area is extracted from the second image according to the coordinates obtained through mapping.

The processor 230 may send the image of the shielding area onto the display 240 for display after the segmentation treatment of the image of the shielding area. Thus, the user can know the condition of the shielding area behind the A pillar, which area is originally shielded by the A pillar, according to the image displayed on the display 240.

For instance, the process of extracting the image of the shielding area by the processor 230 can also be implemented in real time. When the eye position changes due to the change of the sitting posture of the user, the image of the shielding area segmented by the processor 230 can also change correspondingly according to the change of the viewing angle of the user. Thus, the user can more conveniently observe the condition in the shielding area behind the A pillar, which area is originally shielded by the A pillar.

In the embodiments of the present disclosure, the method of acquiring the first image, the second image and the image of the shielding area is not limited to the above ways. The present disclosure is not limited to the specific ways. For instance, the center point of the upper surface of the first space (namely a plane defined by the vertexes JHIK) is selected; the center point of the A pillar (for instance, the cross point of the connecting line connecting the vertexes O and R and the connecting line connecting the vertexes P and Q) is selected; and the second camera is mounted in the middle of the A pillar, facing the direction of the connecting line of these two center points, and then acquires the second image within the first range on the outside of the car pillar. Subsequently, the shielding area is determined according to the position of the human eyes and the A pillar; the image of the shielding area is selected out of the second image; and the selected image of the shielding area is displayed in the display mounted on the A pillar.

In another example of the present disclosure, the processor 230 may further include a storage device, which can store, for instance, the above segmented image of the shielding area in real time. Thus, the vehicle auxiliary display device provided by the embodiment of the present disclosure may also have the function of a tachograph.

An embodiment of the present disclosure determines the position of the user and the monitoring range on the outside of the A pillar according to the images acquired by the first camera and the second camera, extracts the image of the visual blind area due to the A pillar from the captured image within the monitoring range on the outside of the A pillar according to the position of the user, displays the image of the visual blind area due to the A pillar on the display on the A pillar, allows the user to "view" the condition in the area shielded by the A pillar through the display, and hence solves the blind area problem caused by the A pillar and improves the degree of driving safety.

FIGS. 5a-5g are schematic diagrams illustrating the monitoring modes of the second camera in another embodiment of the present disclosure. As shown in FIG. 5a, as the position of the A pillar 110 is mostly not completely perpendicular to the plane provided with the car and has a specific oblique angle f with respect to the direction perpendicular to the plane provided with the car, and the current display technology mainly aims to obtain rectangular displays due to the utilization rate of glass substrates; a rectangular display may be mounted on the A pillar basically perpendicular to the level ground, but only a small-sized display can be selected in this case; or the rectangular display may also be mounted on the A pillar along the inclined direction of the A pillar, and a larger display may be selected in this case, but played monitoring video is also oblique for users, so the display is unfavorable for the usage of the user. Thus, in order to obtain better perspective effect, in another embodiment of the present disclosure, the second camera 120 is used in monitoring after being inclined by a first angle relative to the direction perpendicular to the plane provided with the car, and the display 240 on the A pillar 110 is used for display after being inclined by a second angle relative to the direction perpendicular to the plane provided with the car. In this case, although the image of the shielding area of the A pillar displayed by the display 240 is oblique relative to the display 240, the observed image is not oblique relative to the direction perpendicular to the plane provided with the car. That is to say, as for the user, the image observed by the user is not oblique. It should be noted that the plane provided with the car is not a plane perpendicular to the gravity and changes along with the position of the car; and correspondingly the plane provided with the car is a surface of a slope when the car is driving on the slope.

FIG. 5b illustrates a second image obtained by conventional shooting, namely an image obtained by shooting along the horizontal and vertical directions. FIG. 5c illustrates the second image obtained by conventional shooting and displayed by the display 240 which is regularly placed (namely horizontally and vertically placed). FIG. 5d illustrates the display effect of the second image obtained by conventional shooting but displayed by the display obliquely arranged on the A pillar. It can be seen that the image viewed by the user in this case is oblique, which is not conducive to the recognition of the image content by the user. In the example of the embodiment of the present disclosure, as shown in FIG. 5e, firstly, the second camera 120 is adopted for shooting after rotating by a first angle (e.g., rotating by the f angle) relative to the direction perpendicular to the plane provided with the car. Compared with the image in FIG. 5b obtained by conventional shooting, the captured second image is also inclined by the first angle relative to the side of the rectangular image. As shown in FIG. 5f, if the content captured in FIG. 5e is displayed on the regularly placed display, the displayed content is inclined by the first angle relative to four sides of the display. However, the display 240 obliquely arranged on the A pillar rotates by a second angle. Thus, as shown in FIG. 5g, if the content captured in FIG. 5e is displayed on the display, although the displayed content is still oblique relative to the four sides of the display, the content is horizontally and vertically arranged relative to the user and is consistent or basically consistent with the content viewed in a normal display mode. Herein, the second angle is preferably the same as the first angle. Even if the first angle and the second angle are different, the difference between both is also preferably less than, e.g., 5°. Thus, although the image viewed by the user on the display 240 on the A pillar is oblique relative to the display to some degree, the image is not oblique relative to the ground provided with the car, namely being basically the same as the normal viewing angle.

The embodiment of the present disclosure can effectively adjust the display angle of the display image via physical rotation of the second camera and the display, provides convenience for the user to rapidly recognize the image of the shielding area, further improves the safety degree, can also reduce amount of system data processing, adopts the display to replace an expensive anomalous screen, and saves the production cost.

In addition, an embodiment of the present disclosure further provides a vehicle, for instance, a car, which comprises the vehicle auxiliary display device provided by any of the above embodiments. In the car, at least one pillar is equipped with the vehicle auxiliary display device. For instance, one A pillar is equipped with the vehicle auxiliary display device, or two A pillars are each equipped with the vehicle auxiliary display device, or a B pillar and a C pillar are also equipped with the vehicle auxiliary display device. The vehicle auxiliary display device is the same as any of the above embodiments. No further description will be given here. Moreover, for instance, when both two A pillars are equipped with the vehicle auxiliary display device, for both the two A pillars the first camera may be the same but the second cameras are different.

In order to mount the vehicle auxiliary display device in the car pillar, an embodiment of the present disclosure also improves the structure of the car pillar. Description will be given below only by taking the A pillar of the car as an example. FIG. 6 is a schematic structural view illustrating the inside of the A pillar of the car in the embodiment of the present disclosure. As shown in FIG. 5, the A pillar 110 includes a body 610, a barrier part 611, a safety airbag 612 and a display 240. The barrier part 611 isolates the safety airbag 612 from the display 240, so as to effectively prevent the display from being burst and hurting the staff in the car when the safety airbag pops up.

In addition, the A pillar may further include a shield 620. The shield 620 is shown by dotted lines in FIG. 6 and is in an open state. The shield 620 covers the body 610 of the A pillar in a normal mounting state and can be turned on or off relative to the body 610 of the A pillar. For instance, a fixed rotating shaft 613 is also disposed on one side of the body 610, and the shield 620 is connected to the fixed rotating shaft 613 and rotates relative to the fixed rotating shaft 613 and then turned on or off relative to the body 610.

In addition, the other side of the shield 620 can be fastened with the body 610 through a fastening connector. When the shield 620 is turned on relative to the body 610, the fastening connector is switched on. In this case, the shield 620 may be conveniently turned on when required to be turned on, and may also be integrally formed with the body 610 when not required to be turned on.

In addition, an opening 621 is disposed at a position of the shield 620 corresponding to the display 240. A display area of the display 240 may be exposed at the opening position, so as to provide convenience for the viewing of the user. Moreover, other components of the vehicle auxiliary display device, e.g., a processor and a circuit, may also be hidden in the A pillar, for instance, disposed on the inside of the barrier part 611. The processor of the vehicle auxiliary display device may be implemented by an independent processor or may be implemented by, for instance, a central control computer of the car. The implementation is not limited in the embodiment of the present disclosure.

An embodiment of the present disclosure can mount the vehicle auxiliary display device in the A pillar by the design of the inside of the A pillar, without affecting the strength of the A pillar and occupying other space in the car, being both artistic and practical.

An embodiment of the present disclosure further provides a display method of a vehicle auxiliary display device. The display method may be a working method of the vehicle auxiliary display device provided by the above embodiment and is only simply described herein. The specific content may refer to the description in the present disclosure.

Figure 7:
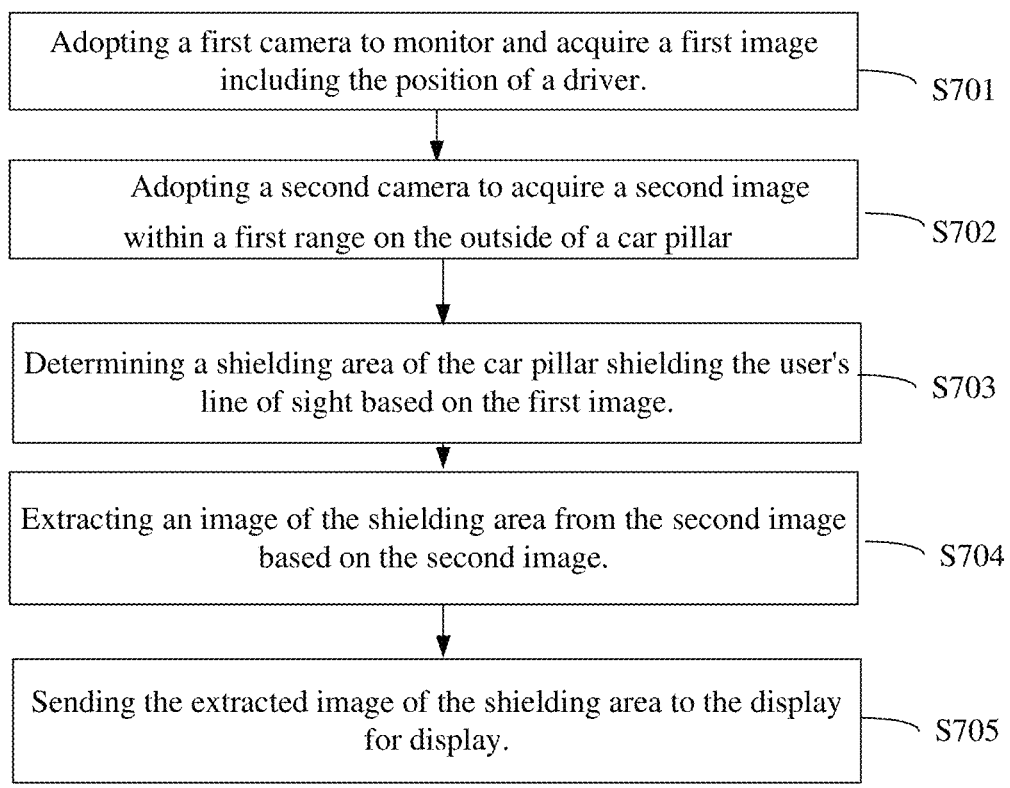
FIG. 7 is a flow diagram of a display method of a vehicle auxiliary display device provided by an embodiment of the present disclosure.

FIG. 7 is a flow diagram of the display method of the vehicle auxiliary display device, provided by the embodiment of the present disclosure. As illustrated in FIG. 7, the display method 700 of the vehicle auxiliary display device may comprise the following steps S701-S705:

Step S701: adopting a first camera to monitor and acquire a first image of the position of a user, for instance, adopting the first camera to monitor and acquire the first image according to a first space determined according to an area provided with the main driving seat and the vertical height of the A pillar.

Step S702: adopting a second camera to acquire a second image within a first range on the outside of a car pillar, for instance, adopting the second camera to acquire the second image according to a second space formed by extension lines from vertexes of the first space to vertexes of the A pillar.

Step S703: determining a shielding area of the car pillar for shielding the user's line of sight based on the first image. For instance, when the first camera is adopted to monitor and acquire the first image including an image of the user's eyes in the step S701, in the step S703, the position of the user's eyes is determined based on the first image; the coordinate of the position of the user's eyes in the first space is determined according to the position of the user's eyes; and the shielding area of the A pillar shielding the user's line of sight is determined according to the coordinate.

Step S704: extracting an image of the shielding area from the second image based on the second image, for instance, determining extension lines from the coordinate to the vertexes of the A pillar, and determining the shielding area of the A pillar shielding the user's line of sight based on the extension lines, or for instance, determining mapped coordinates of the extension lines mapped into the second image, and extracting the image of the shielding area from the second image based on the mapped coordinates.

Step S705: sending the extracted image of the shielding area to the display for display.

Of course, as described above, the display may also be not used, but the image of the shielding area is sent to a projector for projection or sent to VR or AR glasses for display.

For the image displayed on the display to be compatible with the viewing angle of the user, according to one example of the present disclosure, the second camera acquires the second image after rotating by a first angle relative to the direction perpendicular to the plane provided with the car, and the display displays the image of the shielding area of the A pillar after rotating by a second angle relative to the direction perpendicular to the plane provided with the car, so that the image of the shielding area of the A pillar displayed on the display can be inclined relative to the edge of the display and not inclined relative to the image in the second image.

An embodiment of the present disclosure reflects the external condition at the blind area of corresponding A pillar onto the display of the A pillar in real time after image processing according to the viewing position of the human eyes through the monitoring of the first and second cameras, achieves the perspective effect of the A pillar, and improves the driving safety.

It should be understood by those skilled in the art that the units and the algorithm in the examples of the embodiments of the present disclosure can be implemented by electronic hardware, firmware, software or a combination thereof. Moreover, a software module may be placed into a computer storage medium in any form. In order to clearly illustrate the interchangeability of hardware and software, the components and the steps in the examples have been generally described in the above description according to functions. Whether these functions are executed by hardware or software depends on specific applications and design constraints of the technical proposal. Each specific application may implement the described function by different methods by those skilled in the art, but the implementation shall not exceed the scope of the present disclosure.

It should be understood by those skilled in the art that various modifications, combinations, partial combinations and replacements may be made to the present disclosure based on the design demand and other factors, as long as they fall within the scope of the appended claims and equivalent characteristics thereof.

The application claims priority to the Chinese patent application No. 201610721420.8, filed on Aug. 24, 2016, the entire disclosure of which is incorporated herein by reference as part of the present application.

What is claimed is:

1. A vehicle auxiliary display device, comprising:
a first camera configured to acquire a first image of a position of a user;
a second camera configured to acquire a second image within a first range on an outside of a pillar of a vehicle;
a processor configured to determine a shielding area of the pillar shielding the user's line of sight based on the first image, extract an image of the shielding area from the second image based on the second image, and send the image of the shielding area to the user; and
a display configured to display the image of the shielding area,
wherein the second camera forms a first angle with respect to the direction perpendicular to the plane provided with the vehicle and is configured to acquire the second image,
the display forms a second angle with respect to the direction perpendicular to the plane provided with the vehicle,
the display is disposed on an A pillar of the pillar, so that the image of the shielding area displayed on the display can be inclined relative to an edge of the display but not inclined relative to the direction perpendicular to the plane provided with the vehicle, and
the first angle, the second angle and an angle of the A pillar relative to the direction perpendicular to the plane provided with the vehicle are all equal,
the first camera is configured to acquire the first image according to a first space determined by an area provided with a main driving seat and a height of an A pillar as the pillar in a direction perpendicular to a plane provided with the vehicle, and
the second camera is configured to acquire the second image according to a second space defined by first extension lines of connecting lines of at least part of vertexes of the first space and at least part of vertexes of the A pillar.

2. The device according to claim 1, wherein the first image acquired by the first camera includes an image of the user's eyes; and
the processor determines a position of the user's eyes based on the first image, determines a coordinate of the user's eyes in the first space based on the position of the user's eye, and determines the shielding area of the A pillar shielding the user's line of sight based on the coordinate.

3. The device according to claim 2, wherein
the processor determines second extension lines of connecting lines from the coordinate to the vertexes of the A pillar, and determines the shielding area of the A pillar shielding the user's line of sight based on the second extension lines.

4. The device according to claim 3, wherein the processor determines vertexes of the shielding area in the second image according to the second extension lines, and extracts the image of the shielding area from the second image based on the vertexes of the shielding area.

5. A vehicle, comprising: pillars and the vehicle auxiliary display device according to claim 1,
wherein one of the pillars is equipped with a display of the vehicle auxiliary display device.

6. The vehicle according to claim 5, wherein the pillars include A pillars; and the vehicle auxiliary display device is disposed on at least one A pillar on the front of the vehicle.

7. The vehicle according to claim 6, wherein the at least one A pillar includes a body; the body includes a barrier part and a safety airbag; and the barrier part is configured to isolate the safety airbag from the display.

8. The vehicle according to claim 7, wherein the at least one A pillar further includes a shield; and the shield is capable of covering the body of the A pillar and is able to be turned on or off relative to the body of the A pillar.

9. The vehicle according to claim 8, wherein an opening is disposed at a position of the shield corresponding to the display and configured to expose a display area of the display.

10. The device according to claim 1, wherein the display is a rectangular display.

11. A display method of a vehicle auxiliary display device, the vehicle auxiliary display device comprising a first camera and a second camera, the display method comprising:
adopting the first camera to acquire a first image of a position of a user;
adopting the second camera to acquire a second image within a first range on an outside of a pillar;
determining a shielding area of the pillar shielding the user's line of sight based on the first image, and extracting an image of the shielding area from the second image based on the second image;
sending the extracted image of the shielding area to the user; and
displaying the image of the shielding area on a display,
wherein the second camera forms a first angle with respect to the direction perpendicular to the plane provided with the vehicle and is configured to acquire the second image,
the display forms a second angle with respect to the direction perpendicular to the plane provided with the vehicle,
the display is disposed on an A pillar of the pillar, so that the image of the shielding area displayed on the display can be inclined relative to an edge of the display but not inclined relative to the direction perpendicular to the plane provided with the vehicle, and
the first angle, the second angle and an angle of the A pillar relative to the direction perpendicular to the plane provided with the vehicle are all equal,
the first camera is adopted to acquire the first image according to a first space determined by an area provided with a main driving seat and a height of an A pillar as the pillar in a direction perpendicular to the plane provided with the vehicle, and
the second camera is adopted to acquire the second image according to a second space formed by first extension lines of connecting lines of at least part of vertexes of the first space and at least part of vertexes of the A pillar.

12. The display method according to claim 11, wherein the first camera is adopted to acquire the first image including an image of the user's eyes, determine the position of the user's eyes based on the first image, determine a coordinate of the position of the user's eyes in the first space based on the position of the user's eye, and determine the shielding area of the A pillar shielding the user's line of sight based on the coordinate.

13. The device according to claim 11, wherein the display is a rectangular display.

\* \* \* \* \*